(12) United States Patent
Hahn et al.

(10) Patent No.: US 7,432,791 B2
(45) Date of Patent: Oct. 7, 2008

(54) MAGNET ARRANGEMENT FOR CARRYING, GUIDING AND/OR BRAKING SYSTEMS IN MAGNETIC LEVITATION VEHICLES

(75) Inventors: Wolfgang Hahn, Kassel (DE); Quinghua Zheng, Taufkirchen (DE)

(73) Assignee: TyssenKrupp Transrapid GmbH, Kassel (DE)

( * ) Notice: Subject to any disclaimer, the term of this patent is extended or adjusted under 35 U.S.C. 154(b) by 168 days.

(21) Appl. No.: 10/590,377

(22) PCT Filed: Mar. 9, 2005

(86) PCT No.: PCT/DE2005/000409

§ 371 (c)(1),
(2), (4) Date: Aug. 23, 2006

(87) PCT Pub. No.: WO2005/090111

PCT Pub. Date: Sep. 29, 2005

(65) Prior Publication Data

US 2007/0169661 A1   Jul. 26, 2007

(30) Foreign Application Priority Data

Mar. 15, 2004   (DE) ........................ 10 2004 012 743

(51) Int. Cl.
    H02K 41/00 (2006.01)

(52) U.S. Cl. .................. 335/296; 335/297; 335/299; 335/301; 310/13; 104/286; 104/294; 318/135

(58) Field of Classification Search ......... 335/296–301; 318/135; 310/12–13; 124/3; 104/281–286, 104/290–294

See application file for complete search history.

(56) References Cited

U.S. PATENT DOCUMENTS 4,636,667 A      1/1987   Holzinger et al.
6,629,358 B2 *  10/2003   Setiabudi et al. .............. 29/609
6,983,701 B2 *   1/2006   Thornton et al. ............ 104/282

FOREIGN PATENT DOCUMENTS

DE    34 10 119    10/1985
JP    54 136017    10/1979

* cited by examiner

Primary Examiner—Ramon M Barrera
(74) Attorney, Agent, or Firm—Michael J. Striker

(57) ABSTRACT

A magnet arrangement (1) for magnetic levitation vehicles is described that is comprised of an electromagnet having a plurality of magnet poles, said magnet poles having cores connected via pole backs (4) and coils (5) coiled onto them, said coils being connected to each other inside and outside in alternating succession. Moreover, said magnet arrangement (1) is comprised of a means (30) for the reduction of resonance oscillations occurring in said coils (5), wherein the pole backs (4) are essential constituents of said means according to the present invention (FIG. 5).

9 Claims, 6 Drawing Sheets

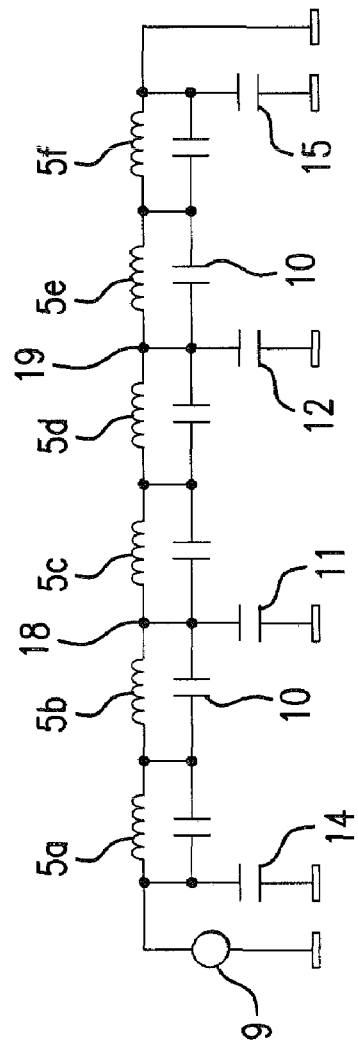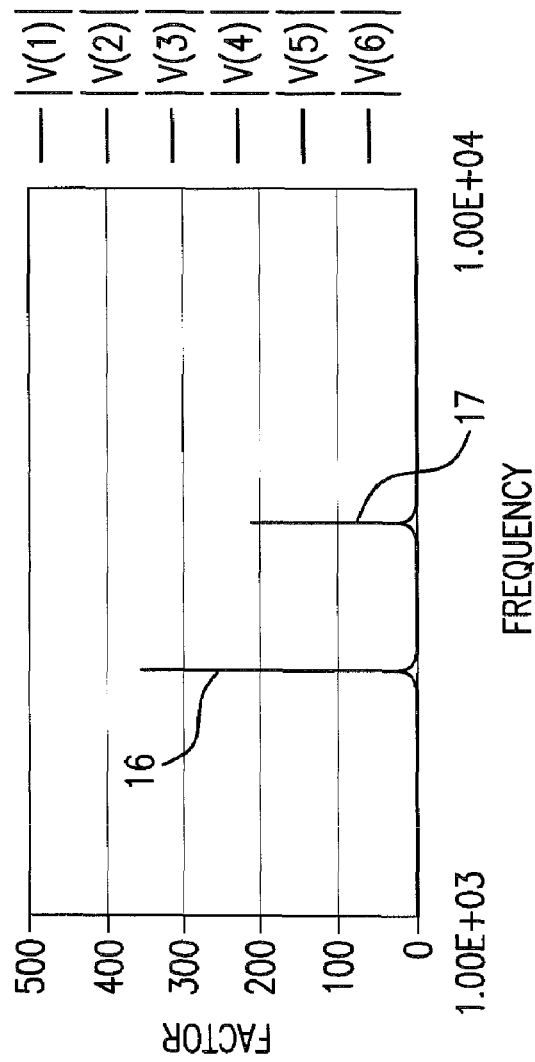
FIG. 2

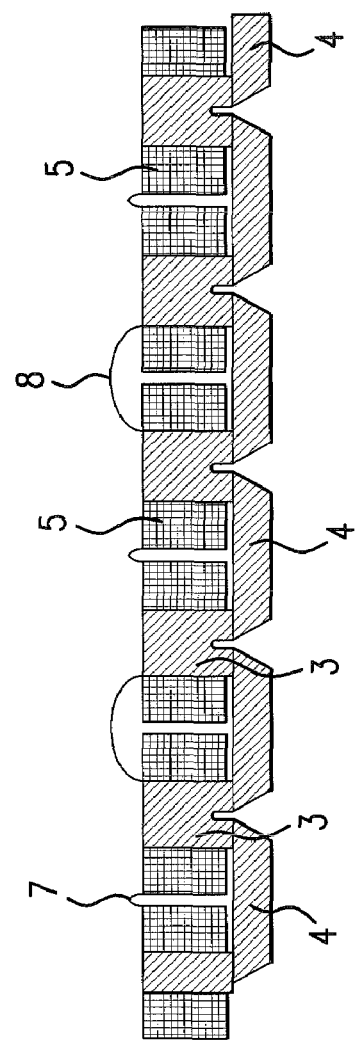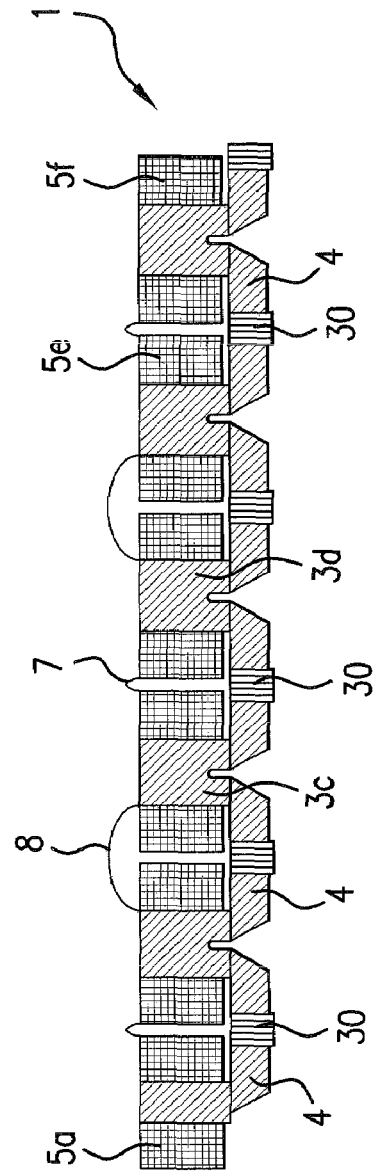

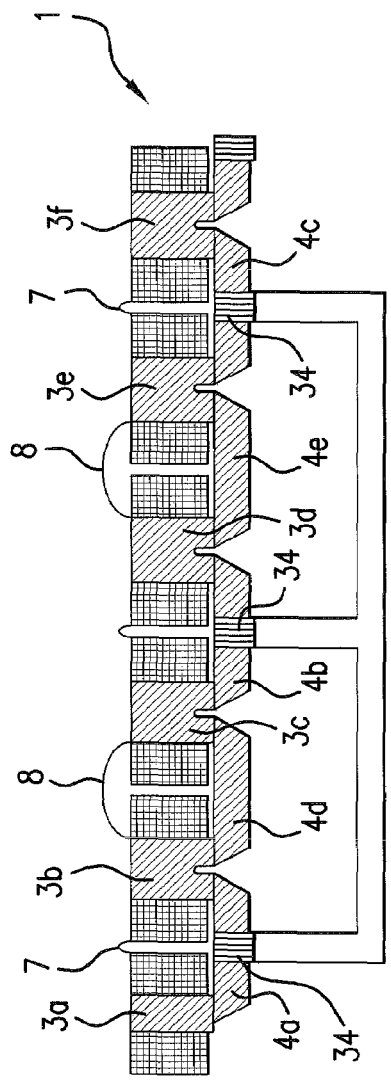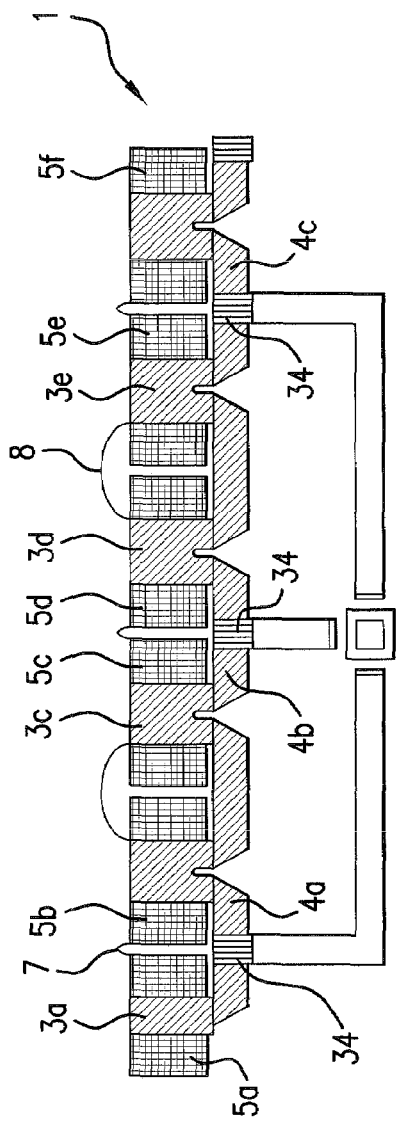

MAGNET ARRANGEMENT FOR CARRYING, GUIDING AND/OR BRAKING SYSTEMS IN MAGNETIC LEVITATION VEHICLES

The present invention relates to a magnet arrangement according to the species designated in the preamble of claim 1.

With magnet arrangements of this kind (DE 34 10 119 C2), the cores, particularly those destined for carrier magnets, are comprised of a plurality of plates or sheets compiled to form a sheet metal pack, thus leading to a low intrinsic attenuation for the magnet arrangement as a whole. Moreover, the windings of the coils in most cases are formed by conductor strips wound around the core and connected to each other in alternating succession at their ends located radially outside away from the core and radially inside near the core. This results in numerous parasitary longitudinal and transverse capacities between the individual layers of the windings and/or between the layers radially located farest inside and the core, which together with the inductivities (inductances) of the windings form electrical resonant circuits. Due to the low intrinsic attenuation during excitation of the magnet arrangement, these resonant circuits lead to electrical oscillations and excessive voltage rates at critical points of the magnet arrangement, particularly when reaching the relevant resonance frequency ranges.

Voltage overshoots involve particularly adverse effects at those points of the magnet arrangement where the innermost layers of two adjacent windings lying nearest to the relevant core are electrically connected with each other by internal connection lines. The resulting voltages and/or electric currents might be so high that the insulation layers arranged between the first layers and the core are destroyed, thus rendering the entire magnet arrangement useless.

To avoid insulation damage it would be possible to rate the space between the cores and the relevant first winding layers large enough in radial direction and/or to provide the inner insulation layers with an adequate thickness. However, this would entail a disadvantage in that the heat loss generated in the coils could not be dissipated any longer radially via the cores acting as cooling elements, thus deteriorating the cooling efficiency noticeably. On the other hand, the spaces mentioned before would no longer be available for the windings, thus reducing the space factors.

In practice, the oscillations occurring with magnet arrangements of the species designated hereinabove are attenuated by resistors connected in parallel to the coils and forming a passive attenuation network. However, such a network entails a significant drawback in that the resistors generate quite a substantial heat loss and therefore have to be cooled with ambient air, which is difficult to accomplish, and moreover, these resistors would have to be made of high-grade quality materials to safely avoid any damage during operation. This would substantially increase the cost expenditure for the magnet arrangement.

Now, therefore and in consideration hereof, it is the object of the present invention to configure the magnet arrangement of the species as designated hereinabove in such a manner that the oscillations as described can be reduced and/or rendered harmless even without applying any ohmic resistors.

The characterizing features of claim 1 serve to solve this object.

The present invention yields an advantage in that the resonances occurring on excitation of the magnet arrangement are noticeably attenuated by the aid and/or application of the pole backs existing in any way or in that the voltage and/or electrical current overshoots caused by them are so compensated that insulation damage is effectively avoided.

Other advantages of the present invention become evident from the subclaims.

The present invention is explained in more detail hereinafter in conjunction with embodiments and based upon the appending drawings, in which FIG. 1 shows a schematic section through a magnet arrangement for magnetic levitation vehicles with long stator drive;

FIG. 2 shows a schematic view of a substitute circuit diagram for the magnet arrangement according to FIG. 1;

Figure 1:
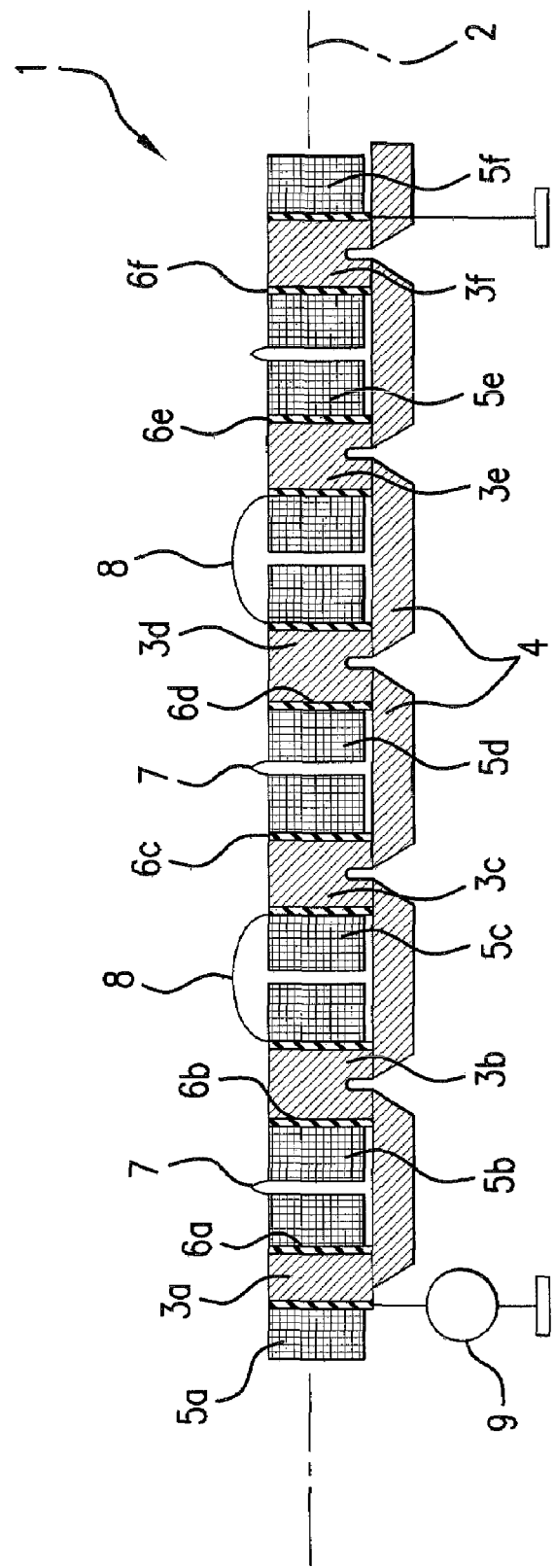
Figure 6:
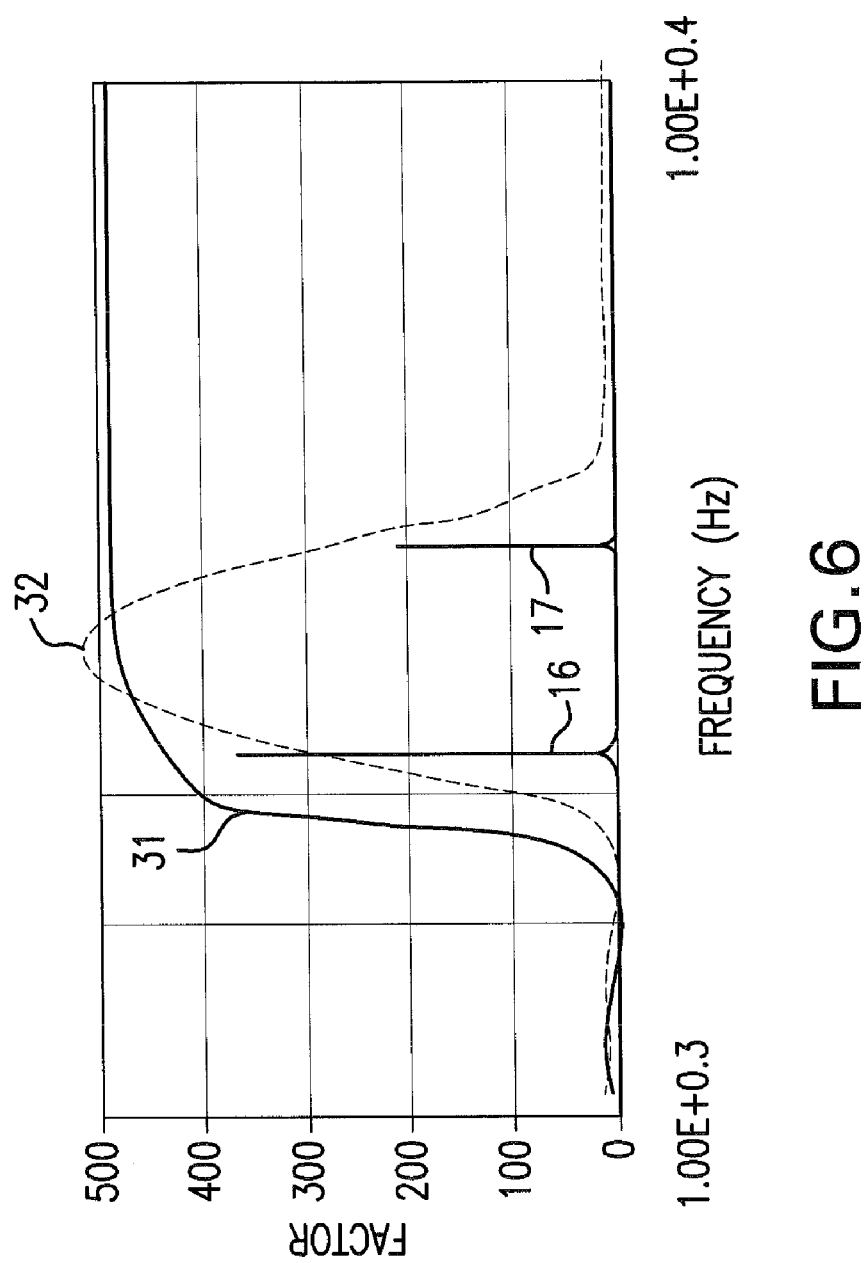

FIGS. 4 and 5 each show a section according to FIG. 1 through a first and a second embodiment of a magnet arrangement according to the present invention;

FIG. 6 shows a diagram with attenuation curves obtained when implementing the embodiment according to FIGS. 4 and 5; and FIGS. 7 and 8 show sections according to FIG. 1 through another two embodiments of the magnet arrangement according to the present invention.

According to FIG. 1, the iron body of a conventional magnet arrangement 1, e.g. configured as a carrier magnet and suitable for magnetic levitation vehicles equipped with a long stator drive, is provided with a meander-like cross-section in a longitudinal direction defined by a longitudinal axis 2. Several, here six cores $3a$ to $3f$, arranged at a certain distance from each other, are magnetically connected to each other at their underside through one so-called pole back 4 each, with the cores 3 and the pole backs 4 usually being connected to ground. Between the cores $3a$ to $3f$ and above the pole backs 4, the magnet arrangement 1 is provided with grooves running transversely to the longitudinal axis 2 and having rectangular cross-sections, and in which coils $5a$ to $5f$ wound around allocated cores $3a$ and $3f$ are arranged. Coils $5a$ to $5f$ consist of conductor strips not shown which have a width that corresponds to the height of the grooves and which are wound in close contact to each other around said cores $3a$ to $3f$.

Insulation layers not shown are provided between the individual layers of the conductor strips, and another insulation layer $6a$ to $6f$ each is provided between the relevant layers radially located farest inside and the relevant cores $3a$ to $3f$.

Moreover, the radially outermost layers of the coils $5a$, $5b$, and $5c$, $5d$ and $5e$, $5f$, respectively are electrically connected to each other through external connection lines 7, while the radially innermost layers of the coils $5b$, $5c$ and $5d$, $5e$, respectively, are electrically connected to each other through internal connection lines 8, so that the internal and external connection lines 7, 8 alternate each other in longitudinal direction. Finally, excitation of the magnet arrangement 1 is accomplished by way of an electric current converter (chopper) 9 which is connected to the innermost layer of coil $5a$, while the innermost layer of coil $5f$ is connected to ground. The cores $3a$ to $3f$ together with the pertaining coils $5a$ to $5f$ form one magnet pole each with alternating polarity in the direction of longitudinal axis 2.

The equivalent circuit diagram for the magnet arrangement 1 according to FIG. 1 is shown in FIG. 2, with equal parts being designated by the same reference numbers. It becomes evident thereof that in parallel to the individual coils $5a$ to $5f$ and formed by their layers, longitudinal capacities 10 exist being arranged in series. Moreover, at those points where the innermost layers of coils $5b$, $5c$ and $5d$, $5e$ respectiveley are connected to each other by the connection lines 7, there is a comparably great transverse capacity 11 and 12 respectively, each leading to the pertaining core connected to ground, and at those points where the innermost layers of the coils 5a, 5f have a connection extending from the innermost layer to the outside, there is a transverse capacity 14, 15 each being roughly half as big as the capacity 11 or 12 and leading to the ground.

On account of this arrangement, the coils or inductivities 5a to 5f form together with the capacities 10 and 11 to 15 an oscillating circuit in which electrical oscillations are generated on excitation of the magnet arrangement 1 by means of the electric current converter 9, said electrical oscillations for example having two resonance frequencies depending on the layout of the magnet arrangement 1 and being indicated by two peaks 16 and 17 underneath the equivalent circuit diagram in FIG. 2.

Figure 3:
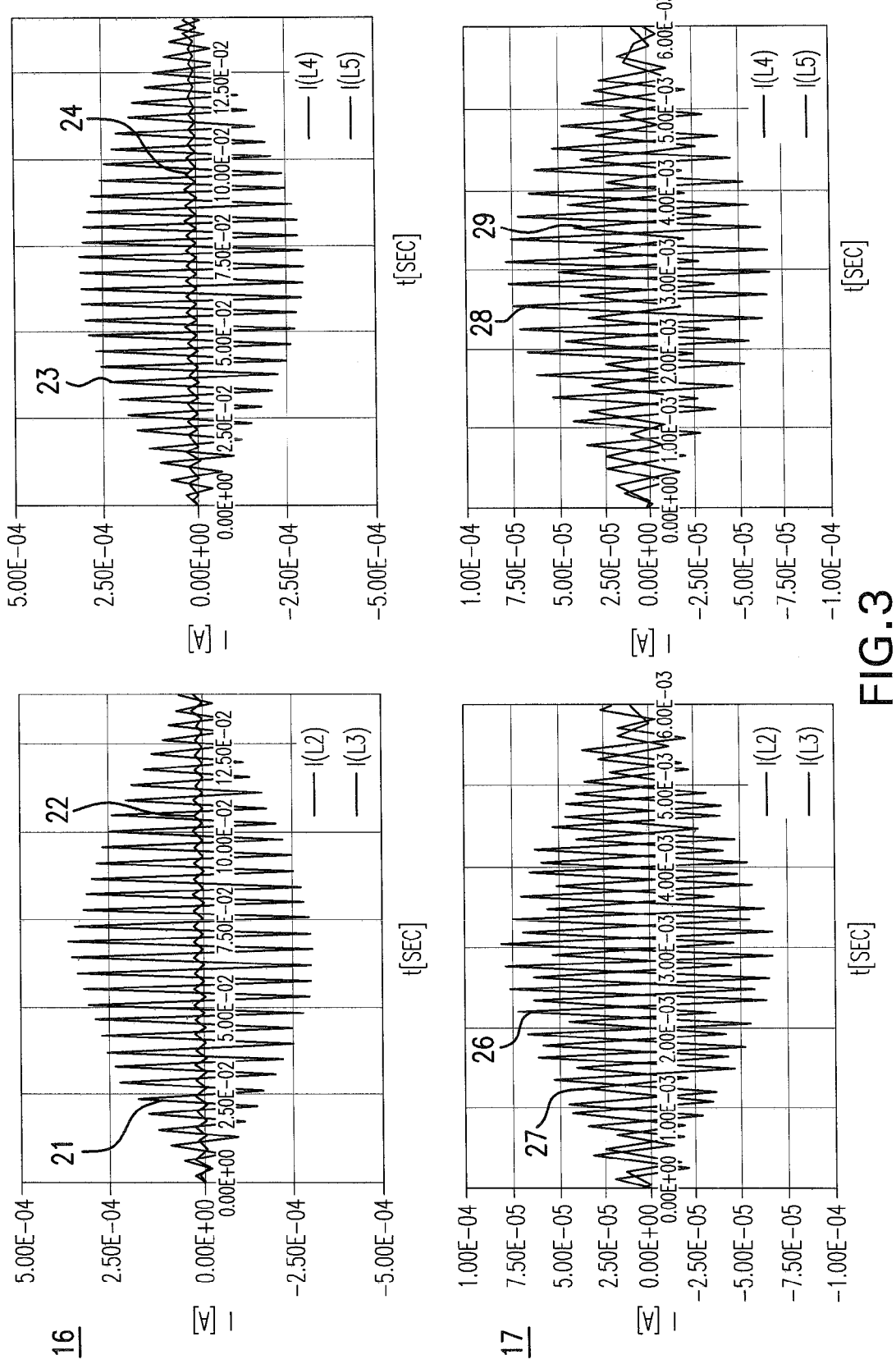
FIG. 3 shows graphs for the resonant oscillations occurring on excitation of the magnet arrangement according to FIGS. 1 and 2.

A particularly critical behavior at these frequencies demonstrate two connecting points 18 and 19 being arranged between the coils 5b, 5c on the one hand and 5d, 5e (FIG. 2) on the other hand, and leading to ground via the capacities 11, 12. At these points, as shown on FIG. 1, the innermost layers of coils 5b, 5c and 5d, 5e are connected to each other. If the insulation 6 at these points disrupts towards the relevant core 3 and/or towards the ground, a short-circuit will occur and thus render the magnet arrangement 1 useless. Contrary, other switching points are comparably uncritical, e.g. points where the coils 5a, 5b and 5c, 5d etc. are connected externally, as well as the connecting points which are linked to capacities 14 and 15. A consequence of this all is that the voltage rates at the connecting points 18 and 19 rise substantially at the resonance frequencies according to FIG. 2 and that the electric currents through the adjacent coils 5b, 5c and 5d, 5e, respectively, adopt very different values. For example, this becomes evident from the measuring curves shown in FIG. 3, in which the time is plotted along the abscissa and wherein the electrical current is plotted along the ordinate. As shown at the top and on the left side of FIG. 3, a curve 21 represents the electrical current flowing through coil 5b and a curve 22 represents the electrical current flowing through coil 5c in case that the circuitry according to FIG. 2 is excited by means of electric current converter 9 with a sinusoidal voltage near the one resonance frequency (Peak 16) in FIG. 2. Correspondingly, curves 23, 24 are shown at the top on the right side for the electrical currents flowing at the same frequency in coils 5e and 5d. In the bottom part of FIG. 3, curves 25, 26 and 28, 29 show the behavior of electrical currents when excitation is accomplished with a frequency which lies near the resonance frequency indicated by peak 17 in FIG. 2. From FIG. 3 it follows that the electrical currents through the coils 5b, 5c and 5d, 5e and, consequently, the electrical currents flowing to the connecting points 18, 19 and/or the electrical currents flowing from these connecting points 18, 19 differ substantially from each other. Moreover, the electrical currents at resonance frequency according to peak 17 are phase-shifted by 180θ each (curves 26, 27 and 28, 29, respectively). Because voltages in a magnitude of $10^4$ V as compared to conventional operating voltages of approximately 440V may occur, differential currents flow via the capacities 11 and 12, thus entailing the danger of disrupting the insulation.

Hence, it is attempted in accordance with the present invention to attenuate the oscillating circuit, and particularly to reduce or adapt to each other the electrical currents flowing through coils 5b, 5c on the one hand and 5d, 5e on the other hand so as to avoid harmful consequences from resonance. The idea being behind this approach is that the pole backs (FIG. 1) themselves which are existing in any case may be used as essential means for attenuation and/or compensation.

With the embodiment according FIG. 4 it is proposed to manufacture selected pole backs 4 from a material having high eddy current losses and/or preferably from massive components rather than of individual sheet metal lamellae. Since the individual coils 5a to 5f are magnetically coupled to each other via the iron cores 3 and pole backs 4, eddy currents in the pole backs 4 automatically lead to a dynamic attenuation. Minor heat losses occurring due to these eddy currents are dissipated via the continuous iron body of the magnet arrangement 1, particularly if pole backs 4 are of a massive structure. The electrical currents flowing off from the connecting points 18, 19 via capacities 11, 12 can be substantially reduced in this manner. Consequently, the maximum voltages occurring at the connection points 18, 19 are so low that they range by far under the disruptive voltages for the relevant insulation layers.

The same applies if selected pole backs 4 according to FIG. 5 are wrapped with at least one short-circuit winding 30 each. In particular it may be expedient not to fabricate these short-circuit windings 30 from high-grade conductors, e.g. copper or aluminum, but for example from iron in order to generate high energy losses by them and thus to cause an effective dynamic attenuation.

With both the embodiments pursuant to FIGS. 4 and 5, all the existing pole backs 4 also constitute selected pole backs 4 as all pole backs 4 are configured in the same way.

Moreover, both embodiments of FIGS. 4 and 5 work passively. The embodiment according to FIG. 4 works in the manner of a low-pass filter, leading to an attenuation curve 31 according to FIG. 6. The embodiment pursuant to FIG. 5, on the contrary, works in the manner of a band-pass filter, leading to an attenuation curve 32 in FIG. 6. Both attenuation curves 31, 32 encompass the resonance frequencies 16 and 17.

The embodiments according to FIGS. 7 and 8 in conformity with the present invention show active arrangements for reducing the resonant oscillations occurring in coils 5. In accordance with FIG. 7, it is envisaged to equip selected pole backs 4a, 4b, and 4c, which establish a connection among cores 3a, 3b and 3c, 3d and 3e, 3f, respectively, with a compensation coil 34 each, and to establish a galvanic connection among these three compensation coils 34 in a series circuitry. The arrangement is so chosen that the flow into the pole back 3a and 3b and 3b and 3c each is basically equivalent. As the flow into the pole backs 4d and 4e, which are not provided with a compensation coil 34, influences the pertaining coils 5b and 5c (5d and 5e, respectively) in the same manner, the arrangement as described hereinabove involves that the flows through coils 5b and 5c on the one hand and 5d and 5e on the other hand are basically equivalent. Thereby it can be achieved that at least the electric current peaks occurring in the coils in case of resonance are adapted to each other and the voltage overshoots at the connecting points 18, 19 in FIG. 2 are reduced to such an extent that the electric currents flowing off via the capacities 11, 12 are uncritical.

Besides, an advantage of the embodiments working with short-circuit coils and/or compensation coils 30, 34 is that an adaptation to the resonance frequencies prevailing in a given case can be accomplished by choosing the proper coil parameters. The same applies by analogy to the embodiment of FIG. 8, where a transformer generally designated with reference number 25 is switched between the compensation coils 4. Here, too, the phase angle of the electrical currents generated by induction in the windings 34 and/or the secondary electrical currents discharged from transformer 35 shall be so chosen that the desired compensation efficiency is obtained. In contrast with FIG. 7, transformation ratios that differ from 1:1 can be adjusted and set by transformer 35. Besides, it is also advantageous to apply sheet metal packets composed of individual lamellae for the pole backs 4 of the embodiments according to FIG. 5 to 8.

The present invention is not limited to the embodiments described herein that can be varied in a plurality of ways. In particular, this applies to the intended application of the magnet arrangement 1 as described hereinabove, which could also be applied in guiding or braking magnets, if required. Furthermore, the invention is not limited to coil windings made of flat conductor strips, but by analogy can also be applied to coils with different windings, if the attenuation with these coils is comparably low. The number of magnet poles and/or cores 3 existing per magnet arrangement 1 can also be chosen largely at will. Finally, it is considered self-evident that the different characteristic features can also be applied in combinations other than those shown and described hereinabove.

The invention claimed is:

1. A magnet arrangement for carrying, guiding and/or braking systems with magnetic levitation vehicles, comprising an electromagnet with a plurality of magnet poles having cores (3a to 3f) being arranged one behind the other in a longitudinal direction and being connected by pole backs (4) and having coils (5a to 5f) coiled onto said cores (3a to 3f), which coils are alternately connected inside and outside with a coil (5a to 5f) following in longitudinal direction, and means allocated to said coils (5a to 5f) for reduction of electromagnetic oscillations occurring in said coils, characterized in that at least selected pole backs (4) are configured as constituents of the means.

2. A magnet arrangement according to claim 1, characterized in that the selected pole backs (4) for attenuation of the electrical oscillations are made of a material with high eddy current losses.

3. A magnet arrangement according to claim 2, characterized in that all provided magnet backs (4) are selected ones and are made of a material with high eddy current losses.

4. A magnet arrangement according to claim 1, characterized in that the selected pole backs (4) are wrapped with a short-circuit winding (30).

5. A magnet arrangement according to claim 4, characterized in that all provided pole backs (4) are selected ones and wrapped with a short-circuit winding (30).

6. A magnet arrangement according to claim 1, characterized in that the selected pole backs (4a, 4b, 4c) are wrapped with compensation coils (34) for compensation of electrical currents generated in said coils (5a to 5f), particularly in case of resonance, and that said compensation coils (34) are conductively connected with each other.

7. A magnet arrangement according to claim 6, characterized in that those pole backs (4a, 4b, 4c) are selected pole backs which connect the cores of two coils externally connected to each other (5a, 5b, 5c, 5d, 5e, 5f).

8. A magnet arrangement according to claim 6, characterized in that the compensation coils (34) are connected with each other via transformers (35) switched in between.

9. A magnet arrangement according to claim 6, characterized in that the selected pole backs (4a, 4b, 4c) are comprised of a sheet metal packet made of individual metal sheets.

* * * * *